Feb. 23, 1954  R. C. CHRISTIE  2,670,049
FUEL TANK FOR HELICOPTERS
Filed June 27, 1952
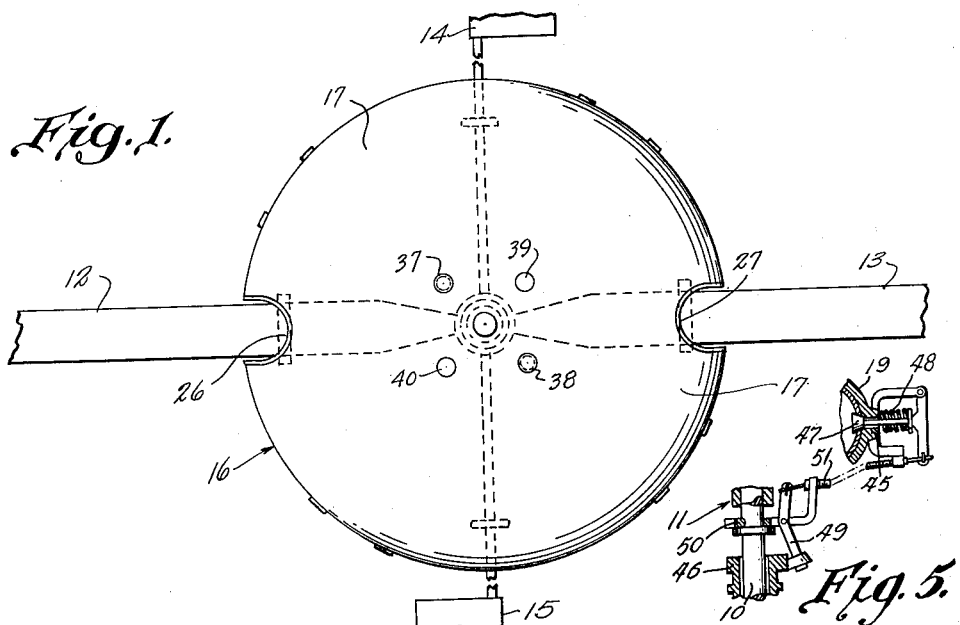
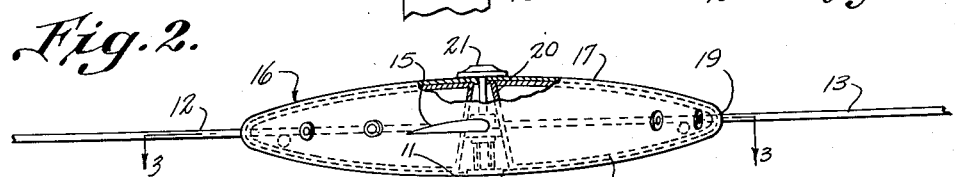
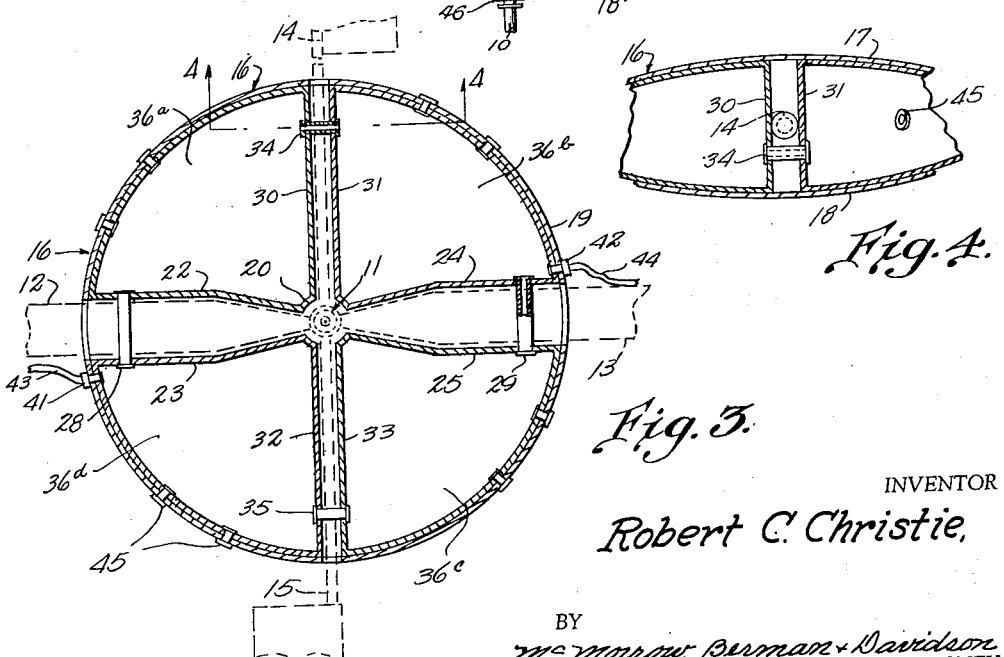
INVENTOR
Robert C. Christie,
BY
McMorrow, Berman & Davidson
ATTORNEYS Patented Feb. 23, 1954

2,670,049

UNITED STATES PATENT OFFICE 2,670,049

FUEL TANK FOR HELICOPTERS

Robert C. Christie, Palm Beach, Fla.

Application June 27, 1952, Serial No. 296,000

4 Claims. (Cl. 170—135.4)

This invention relates to fuel tanks for helicopters and more particularly to a rotatable fuel tank or nacelle mounted substantially concentrically with the rotor hub of a helicopter.

It is among the objects of the invention to provide an improved fuel storage tank or nacelle for a helicopter which is mounted in the helicopter rotor substantially concentrically of the rotor hub and rotates with the rotor; which is of lenticular shape and preferably occupies substantially the inner one-third of the rotor disc; which does not interfere in any way with the normal operation of the rotor and improves the rotor lift particularly when the rotor is rotating at slow speeds and the helicopter is descending; which provides an air cushion effect for the helicopter when the latter is settling onto the ground; which maintains the fuel therein under centrifugal force so that all of the fuel can be withdrawn from the tank; which can be used to supply fuel to jet propulsion devices on the outer ends of the rotor blades or to a helicopter engine of the conventional internal combustion type; which includes means for discharging or dumping the fuel therein under centrifugal force in case of emergency; and which is simple and durable in construction, economical to manufacture, and effective and efficient in operation.

Other objects and advantages will become apparent from a consideration of the following description and the appended claims in conjunction with the accompanying drawing wherein:

Figure 1 is a top plan view of a helicopter fuel tank illustrative of the invention with the associated fragmentary portion of a helicopter rotor;

Figure 2 is a side elevational view of the tank and rotor illustrated in Figure 1 with a portion of the tank broken away and shown in cross section to better illustrate the construction thereof;

Figure 3 is a cross sectional view on the line 3—3 of Figure 2;

Figure 4 is a fragmentary cross sectional view on an enlarged scale on the line 4—4 of Figure 3; and Figure 5 is a diagrammatic view of a manually operated discharge valve for the fuel tank.

With continued reference to the drawing, the numeral 10 generally indicates a helicopter rotor mast and the numeral 11 generally indicates a rotor hub journaled on the upper end of the mast. Main rotor blades 12 and 13 having their longitudinal center lines disposed substantially in a single plane which also includes the longitudinal center line of the mast 10 are pivotally connected at their inner ends to the hub 11 for free coning movements relative to the hub and for pitch changing rotational movements about their longitudinal center lines as axes. Rotor control blades or paddles 14 and 15, also having their longitudinal center lines or axes substantially in a common plane which also includes the longitudinal center line of the mast 10 are pivotally connected at their inner ends to the hubs 14 and 15 for free coning movements and for pitch changing rotational movements about their longitudinal center lines as axes, the plane including the axes of the control blades 14 and 15 being disposed substantially perpendicular to the plane including the axes of the main rotor blades 12 and 13.

As helicopter rotors of the character generally indicated above are old and well known to the art, a more detailed illustration and description of the rotor construction is considered unnecessary for the purposes of the present disclosure.

The fuel tank or nacelle of the present invention includes a hollow structure, generally indicated at 16, of lenticular shape formed of suitable sheet metal and preferably of semi-monocoque construction, is mounted on the rotor hub 11 concentrically of the hub for rotation about an axis extending through the thickness of the lenticular body centrally thereof.

The body 16 has upper and lower walls 17 and 18 each of outer convex and inner concave shape joined together along their peripheral edges in a manner to provide a transversely curved peripheral edge 19 of substantially circular shape for the structure 16. An inner wall 20 of truncated conical shape extends transversely of the structure 16 at the center thereof and is secured at its smaller upper end to the inner side of the top wall 17 of the structure, and at its larger, open end to the inner side of the bottom wall 18 of the structure. The top and bottom walls 17 and 18 are provided with apertures within the corresponding ends of the inner wall 20, so that the inner wall 20 provides in the structure 16 a centrally disposed opening receiving the rotor hub 11.

The mast 10 is shown in Figure 2 as extending above the hub 11 and through the top wall 17 of the tank structure 16 and a flat cap 21 is secured on the upper end of the mast 10 and marginally secured to the top wall 17 of the tank structure around the upper end of the inner wall 20 to support the tank structure on the rotor mast for rotation with the helicopter rotor, a suitable bearing, not illustrated, being disposed between the upper end of the mast 10 and the cap 21.

Inner partition walls 22 and 23 extend transversely of the structure 16 between the top and bottom walls 17 and 18 of the structure and from the conical inner wall 20 to the peripheral edge 19 of the structure with their outer portions in spaced apart and substantially parallel relationship to each other and their inner portions converging from the inner ends of the parallel outer portion to the inner wall 20. The partition walls 22 and 23 provide between them a passage disposed radially of the tank structure 16 and receiving the inner end portion of the main rotor blade 12. The top and bottom walls 17 and 18 are cut away at the outer end of the passage between the walls 22 and 23, as indicated at 26 in Figure 1, to provide a space at the end of the passage for the up and down, free coning movements of the main rotor blade 12. Partition walls 24 and 25 similar to the walls 22 and 23 extend from the inner wall 20 of the structure to the peripheral edge 19 of the latter, and from the top to the bottom wall structure at the opposite side of the inner wall 20 from the walls 22 and 23 and provide between them a passage extending radially of the tank structure 16 and receiving the inner end portion of the main rotor blade 13. The top and bottom wall structure is also cut away at the outer end of the passage provided by the partition walls 24 and 25, as indicated at 27 in Figure 1, to provide a space at the outer end of the passage for the free coning movements of the main rotor blade 13.

A pin 28 extends through the partition walls 22 and 23 and transversely of the space between these walls near the outer ends of the partition walls and is disposed below the main rotor blade 12 to provide a rest or stop for downward movements of this blade about the pivotal connection between its inner end and the rotor hub 11. A pin 29, similar to the pin 28, extends through the partition walls 24 and 25 near the outer ends of these walls and transversely of the passage therebetween and is disposed below the main rotor blade 13 to provide a limit stop or rest for downward movement of the associated main rotor blade.

Partition walls 30 and 31 disposed radially of the tank structure 16 and extending in spaced apart and substantially parallel relationship to each other between the top and bottom walls 17 and 18 of the tank structure and from the inner wall 20 to the peripheral edge 19 of the structure provide therebetween a passage receiving the inner end portion of the rotor control blade 14 and similar partition walls 32 and 33 also extending radially of the structure 16 in spaced apart and substantially parallel relationship to each other between the top and bottom walls of the structure and from the inner wall 20 to the peripheral edge 19 of the structure provide between them a passage receiving the inner end portion of the rotor control blade 15.

A pin 34 extends through the partition walls 30 and 31 near the outer ends of the latter and transversely through the space between these walls and is disposed below the rotor control blade 14 to provide a limit stop or rest for downward movement of the blade 14 and a similar pin 35 extends through the walls 32 and 33 near the outer ends of these walls and transversely through the space therebetween and is disposed below the rotor blade 15 to provide a limit stop for downward movement of the blade 15.

The partition walls 22, 23, 24, 25, 30, 31, 32 and 33 divide the tank structure 16 into four substantially quadrant shaped compartments 36a, 36b, 36c and 36d. The pins 29, 34 and 35 are hollow or tubular and each pin provides a fluid passage between the two compartments between which it is interposed.

Filler necks or openings 37 and 38 are provided in the top wall 17 of the tank structure near the upper end of the inner wall 20 of the structure and lead respectively into the fuel compartments 36a and 36c. These filler necks or spouts are provided with closure caps in a manner well known to the art and counterweights 39 and 40 are mounted on the top wall 17 near and at respectively opposite sides of the upper end of the inner wall 20 and are disposed substantially midway between the filler spouts 37 and 38 to counterbalance the weight of these filler spouts during rotation of the tank structure 16 with the helicopter rotor.

Fuel outlet fittings 41 and 42 are mounted in the peripheral edge portion 19 of the tank structure 16 adjacent the main rotor blades 12 and 13 respectively, and, in cases where the helicopter power plant comprises jet propulsion devices mounted on the outer ends of the main rotor blades, fuel lines 43 and 44 lead from the fittings 41 and 42 to the corresponding power plants. As the centrifugal force on the fuel within the tank structure 16 maintains fuel pressure against the inner side of the peripheral edge 19 of the structure during rotation of the structure and the helicopter rotor, fuel will be available to the outlet fittings 41 and 42 as long as there is any fuel remaining in the tank structure.

Where the helicopter is equipped with a power plant in the form of an engine of conventional internal combustion type, the fuel lines 43 and 44 may be led downwardly along the rotor mast 10 and connected through a suitable swivel fitting into the fixed fuel tank for such a power plant.

Emergency fuel discharge or dump valves, as indicated at 45, are mounted in the peripheral edge portion 19 of the tank structure 16 at angularly spaced apart locations around the periphery of the tank structure and are normally closed. In case of emergency these valves may be opened by manipulation of a cam 46 disposed near the lower end of the rotor hub 11 and connected through suitable linkage mechanisms with the discharge valves 45, the cam being so located that the discharge from the valves 45 will take place at a predetermined angular position relative to the helicopter such that the discharged fuel will be discharged rearwardly of the helicopter from the tank structure.

Each of the discharge valves 45 may include a poppet type valve 47 which is spring urged to closed position by a spring 48 and a plurality of cam follower arms 49 are mounted on a collar 50 carried by the mast 10 for movement around the cam 46. Each cam follower arm 49 is connected by a flexible push and pull connector 51 to an associated discharge valve. The cam 46 is held against rotation but may be moved longitudinally of the mast 10 by suitable manually controlled means, not illustrated, into and out of engagement with the cam follower arms, so that the fuel can be dumped by the operator of the helicopter, if such action becomes necessary under emergency conditions.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with a helicopter rotor mast, a rotor hub journaled on said mast and rotor blades pivotally connected at their inner ends to said hub and extending substantially radially therefrom, a fuel storage tank mounted on said mast and comprising a hollow structure of lenticular shape having at its center an inner wall of conical shape extending transversely therethrough and providing in said structure a central opening receiving said rotor hub, and partition walls extend transversely of said structure and from said inner wall to the periphery of said structure providing passages extending radially of said structure through which the inner portion of said blades extend, means in one side of said structure adjacent said inner wall providing closable openings for supplying fuel to the interior of said structure, and means in the peripheral portion of said structure providing fuel outlets for supplying fuel to an associated helicopter power plant.

2. In combination with a helicopter rotor mast, a rotor hub journaled on said mast and rotor blades pivotally connected at their inner ends to said hub and extending substantially radially therefrom, a fuel storage tank mounted on said mast and comprising a hollow structure of lenticular shape having at its center an inner wall of conical shape extending transversely therethrough and providing in said structure a central opening receiving said rotor hub, and partition walls extending transversely of said structure and from said inner wall to the periphery of said structure providing passages extending radially of said structure through which the inner portion of said blades extend, means in one side of said structure adjacent said inner wall providing closable openings for supplying fuel to the interior of said structure, means in the peripheral portion of said structure providing fuel outlets for supplying fuel to an associated helicopter power plant, and manually controlled discharge valves in the peripheral portion of said tank for dumping fuel from the interior of said tank under centrifugal force in emergency conditions.

3. In combination with a helicopter mast and a helicopter rotor including a hub journaled on the mast and blades connected at their inner ends to said hub and extending substantially radially therefrom at angular intervals therearound, a fuel storage tank journaled on said mast concentrically of said rotor and including a hollow structure of lenticular shape having therein means providing a central opening receiving said rotor hub and means providing passages extending radially from said central opening and respectively receiving the inner portions of said rotor blades.

4. In combination with a helicopter mast and a helicopter rotor including a hub journaled on the mast and blades connected at their inner ends to said hub and extending substantially radially therefrom at angular intervals therearound, a fuel storage tank journaled on said mast concentrically of said rotor and including a hollow structure of lenticular shape having therein means providing a central opening receiving said rotor hub and means providing passages extending radially from said central opening and respectively receiving the inner portions of said rotor blades, the last mentioned means dividing the interior of said structure into separate fuel compartments, and means in said structure providing fuel passages between said separate compartments.

ROBERT C. CHRISTIE.

References Cited in the file of this patent

UNITED STATES PATENTS

| Number | Name | Date |
|---|---|---|
| 1,932,702 | Langdon | Oct. 31, 1933 |
| 2,371,687 | Gerhardt | Mar. 20, 1945 |
| 2,415,584 | Fleiss | Feb. 11, 1947 |
| 2,585,468 | Isacco | Feb. 12, 1952 |

FOREIGN PATENTS

| Number | Country | Date |
|---|---|---|
| 57,999 | Denmark | Sept. 16, 1940 |